(12) United States Patent
Huang

(10) Patent No.: US 8,401,335 B2
(45) Date of Patent: Mar. 19, 2013

(54) METHOD FOR OUTPUTTING CONSECUTIVE CHARACTERS IN VIDEO-RECORDING MODE

(75) Inventor: Yu-Hsiang Huang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 345 days.

(21) Appl. No.: 12/759,707

(22) Filed: Apr. 14, 2010

(65) Prior Publication Data

US 2010/0272360 A1 Oct. 28, 2010

(30) Foreign Application Priority Data

Apr. 27, 2009 (TW) .............................. 98113935 A

(51) Int. Cl.
*G06K 9/36* (2006.01)
*G06K 9/18* (2006.01)

(52) U.S. Cl. ........................................ 382/284; 382/182

(58) Field of Classification Search .................. 382/282, 382/284, 294, 174, 176, 181, 182
See application file for complete search history.

(56) References Cited

U.S. PATENT DOCUMENTS

| | | | |
|---|---|---|---|
| 6,404,902 B1 * | 6/2002 | Takano et al. | 382/104 |
| 6,469,689 B1 | 10/2002 | Dow | |
| 7,194,144 B1 * | 3/2007 | Sakai et al. | 382/284 |
| 7,221,796 B2 * | 5/2007 | Nishiyama et al. | 382/182 |
| 7,567,729 B2 * | 7/2009 | Ming | 382/284 |
| 2005/0196070 A1 * | 9/2005 | Takakura et al. | 382/284 |
| 2006/0103893 A1 | 5/2006 | Azimi | |
| 2007/0065040 A1 | 3/2007 | Ming | |
| 2007/0154112 A1 * | 7/2007 | Tanaka | 382/284 |

FOREIGN PATENT DOCUMENTS

| | | |
|---|---|---|
| CN | 2745288 Y | 12/2005 |
| TW | M260947 | 4/2005 |
| TW | 200833084 | 8/2008 |

\* cited by examiner

*Primary Examiner* — Yon Couso
(74) *Attorney, Agent, or Firm* — CKC & Partners Co., Ltd.

(57) ABSTRACT

The invention discloses a method for outputting consecutive characters in a video-recording mode. The method includes obtaining a first image and a second image from an object, comparing the first image and the second image to obtain a third image which is the overlapping part of the first image and the second image, removing the third image from the second image to generate a fourth image, integrating the fourth image with the first image to obtain a fifth image and recognize characters on the fifth image by OCR software and output the characters of the fifth image.

8 Claims, 10 Drawing Sheets

|     |     |     |
| --- | --- | --- |
| $P_{20}$ | $P_{21}$ | $P_{22}$ |
| $P_{10}$ | $P_{11}$ | $P_{12}$ |
| $P_{00}$ | $P_{01}$ | $P_{02}$ |

FIG. 4

METHOD FOR OUTPUTTING CONSECUTIVE CHARACTERS IN VIDEO-RECORDING MODE

BACKGROUND OF THE INVENTION

1. Field of the Invention

The invention discloses a method for photographing a file to obtain images and providing the images to an optical character recognition (OCR) software to recognize characters, thus to generate and output the characters and, more particularly, to a method for photographing a file by a camera, integrating the continuous dynamic images obtained by the camera, that's the video stream, and providing the integrated image to the OCR software to recognize the characters and output the characters.

2. Description of the Prior Art

Products related to the OCR technology provide a subsidiary function for a scanner. A user needs to put a file on a scanner table, and the scanner scans each single page completely. Afterwards, the scanned image is further analyzed via OCR software to abstract words on it. If the word, sentence or a paragraph is separated on two different pages. User has to maintain the order and reassemble the separated word, sentence or paragraph manually.

With the widespread of a handheld device, a skilled person in the art tries to use the OCR technique in a handheld device. In this aspect, we may mention the following situation. First, most users only need some characters or sentences of the scanned file (and the characters are preferably translated, for example, some restaurant menus are printed in French). Second, the characters are arranged in line and consecutive due to the characteristic of the characters, and people also read texts line by line. Therefore, a scanning pen is developed. However, to meet the characteristics of arranging line by line and consecutively, the input interface (video lens) of the scanning pen is a line camera. The line camera considers the two-dimensional characters as a combination of a group of line segments, and it reads and inputs the line segments into the system to combine them and reassemble them to a two-dimensional image. Thus, the OCR software may process the image.

However, in the popular handheld devices (such as a mobile phone), a two-dimensional camera module is disposed. The camera module inputs a series of consecutive two-dimensional images to the system. That is, the input mode of the camera module is similar to that of a tablet scanner. Thus, in use, the images are processed page by page, respectively, which is not in accordance with the people's habit of processing the characters line by line. Thus, the OCR technology is mostly used in business card recognition (BRC) currently. If the consecutive line-by-line input is wanted, additional hardware assistance is needed (such as the technique in patent CN2745288Y).

SUMMARY OF THE INVENTION

The invention discloses a method for outputting consecutive characters in a video-recording mode. The method includes obtaining a first image and a second image from an object, comparing the first image and the second image to obtain a third image which is the overlapping part of the first image and the second image, removing the third image from the second image to generate a fourth image, integrating the fourth image with the first image to obtain a fifth image and recognize characters on the fifth image by OCR software and output the characters of the fifth image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram showing how the edge detection is performed on each single pixel in the embodiment of the invention;

DETAILED DESCRIPTION

The objective of the invention is to use a two-dimensional image input device (a video camera) commonly used in a handheld device to input characters consecutively and line by line without additional hardware assistance.

Therefore, the invention discloses a method. First, a camera (such as the commonly used mobile phone, digital camera and so on) is used to photograph a file. When the camera is moved, it photographs characters as a streaming video data which is a series of images. Then, the photographed images are integrated and provided to OCR software to recognize the characters continuously and sequentially. Therefore, by the method disclosed in the invention, a series of images may be converted to an integrated image, and the integrated image is divided according to characters (to avoid the incomplete character) and provided to the OCR to be recognized. Thus, the function of outputting characters while photographing a file is achieved.

Figure 1:
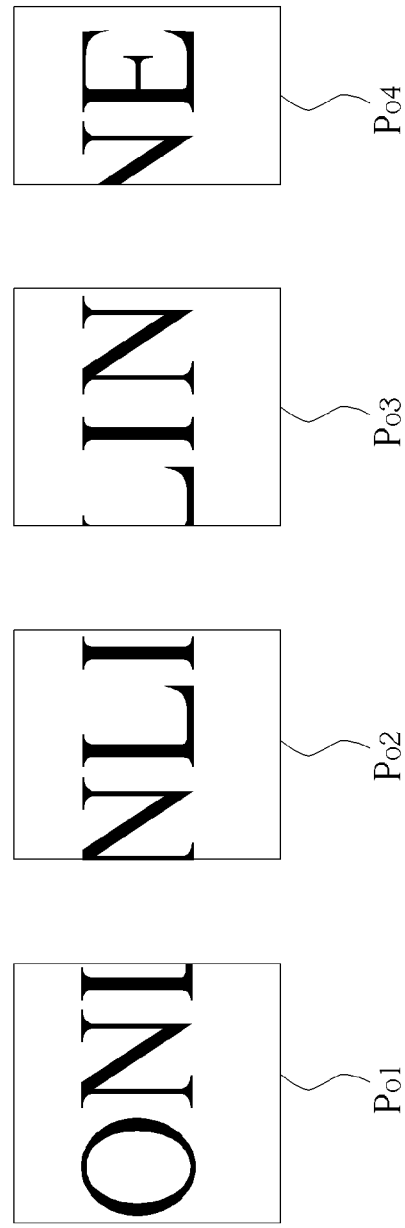
FIG. 1 is a schematic diagram showing that a camera in the invention moves in a direction while photographing.

FIG. 1 is a schematic diagram showing that a camera in the invention moves in a direction while photographing. As shown in FIG. 1, the camera enters a video recording mode and photographs a file. The file has printed characters of "ONLINE". In the video recording mode, the camera may take photos with a sampling frequency. The number of images captured in every second (frame/per second) may be set according to the requirement. For example, user can set the sampling rate to be 5 fps; the camera may capture five images every second in the video recording mode.

In FIG. 1, when the camera moves in the $D_i$ direction (from left to right) and photographs the file, the camera may record the characters on the file "ONLINE". According to the moving speed of the camera and the sampling frequency of the camera in the video recording mode, the camera may capture the images $P_{O1}$, $P_{O2}$, $P_{O3}$ and $P_{O4}$ sequentially. That is, when the camera records images in the $D_1$ direction, it may capture the images $P_{O1}$, $P_{O2}$, $P_{O3}$ and $P_{O4}$. The images $P_{O1}$ to $P_{O4}$ includes all the characters "ONLINE" which needs to be recognized. Since the moving speed of the camera may not match the sampling frequency of the camera in the video recording mode, every two conjunctive images will have an overlapping part. According to the moving direction $D_1$ of the camera, the right part of the image $P_{O1}$ overlap with the left part of the image $P_{O2}$, and the right part of the image $P_{O2}$ overlap with the left part of the image $P_{O3}$, the right part of the image $P_{O3}$ overlap with the left part of the image $P_{O4}$. In the invention, the overlapping parts of the images $P_{O1}$ to $P_{O4}$ are removed, and the remaining images without the overlapping parts are integrated together to generate the correct final image to be provided to the OCR software to recognize. Thus the characters may be outputted correctly.

Figure 2:
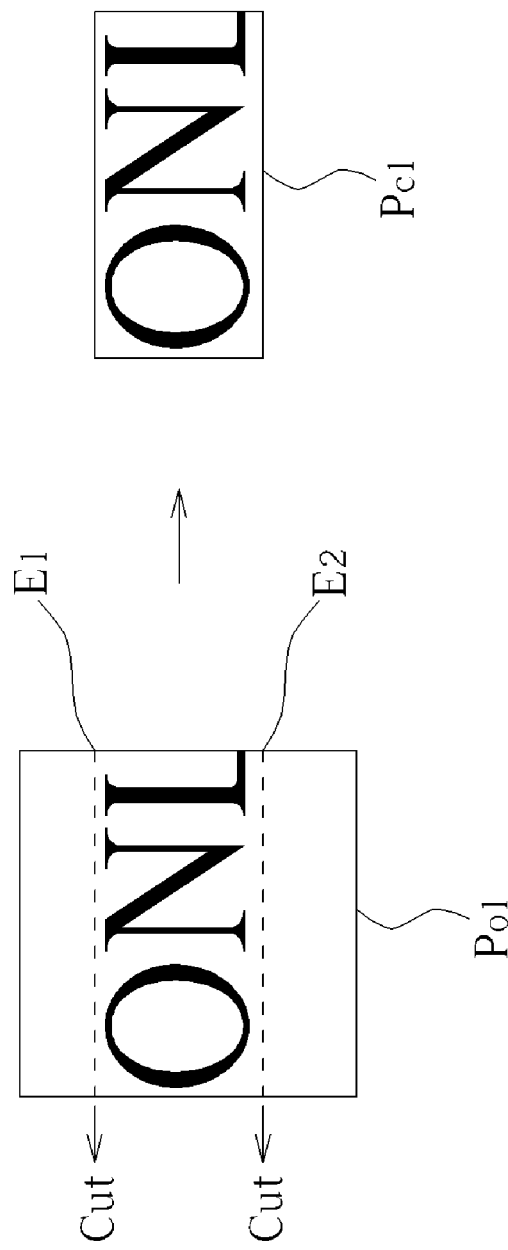
FIG. 2 is a schematic diagram showing an focused-area abstraction is performed on the image in an embodiment of the invention.

FIG. 2 is a schematic diagram showing that a focused-area abstraction is performed on the image in an embodiment of the invention. Since the camera may photograph unnecessary part of the file, to simplify the comparing flow path, the focused-area abstraction is applied on each new received image. As shown in FIG. 2, the original photographed image is $P_{O1}$, and after the focused-area abstraction, the image becomes the cut image $P_{C1}$. In FIG. 2, the unnecessary parts in the original image $P_{O1}$ (such as the blank area in the original image $P_{O1}$) are detected, and then the cutting edges E1 and E2 are defined. Then, the original image $P_{O1}$ is cut according to the edges E1 and E2 to obtain the cut image $P_{C1}$. The images $P_{O1}$ to $P_{O4}$ are cut to be the cut image $P_{C1}$ to $P_{C4}$ before they are processed in the following procedures.

Figure 3:
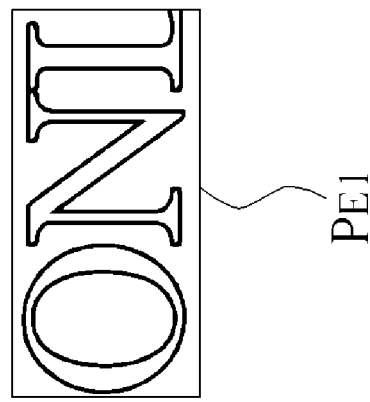
FIG. 3 is a schematic diagram showing that an edge detection is performed on the cut image in the embodiment of the invention.
Figure 3:
Figure 3:
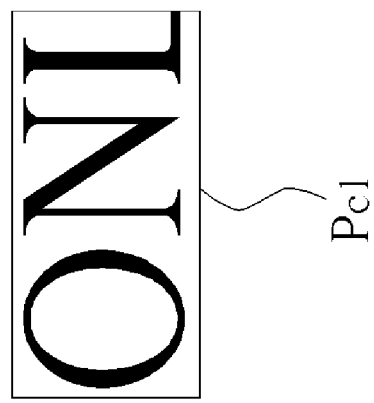

FIG. 3 is a schematic diagram showing that edge detection is performed on the cut image in the embodiment of the invention. To compare the characters, edge detection is performed on the cut image to obtain the edges (border) of the characters in the cut image. As shown in FIG. 3, the original cut image is $P_{C1}$, and after the edge detection, the image becomes the edged image $P_{E1}$. The edge detection is performed on the images $P_{C1}$ to $P_{C4}$ to generate the edged images $P_{E1}$ to $P_{E4}$ before the images $P_{C1}$ to $P_{C4}$ are processed in the following procedures.

Figure 4:
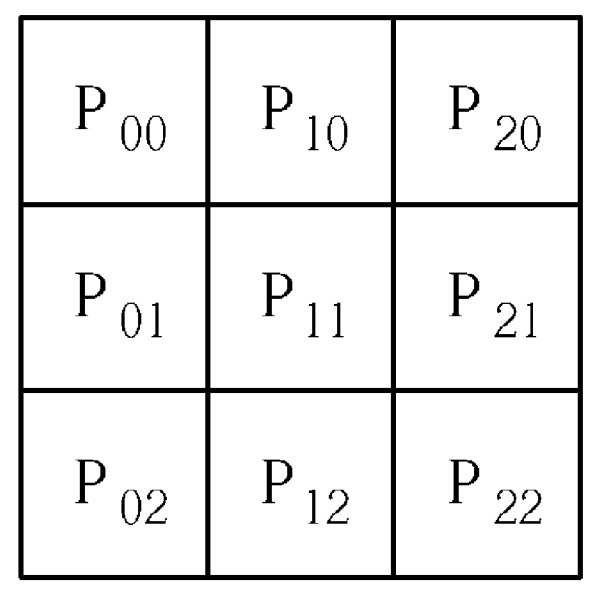

FIG. 4 is a schematic diagram showing an edge detection is performed on each single pixel of the cut image in an embodiment of the in the invention. In FIG. 4, the edge detection is performed in the pixel $P_{11}$, which is taken as an example. The pixel $P_{00}$, $P_{01}$, $P_{02}$, $P_{10}$, $P_{11}$, $P_{12}$, $P_{20}$, $P_{21}$, $P_{22}$ correspond to the coordinate of $(i-1,j-1)$, $(i-1,j)$, $(i-1,j+1)$, $(i,j-1)$, $(i,j)$, $(i,j+1)$, $(i+1,j-1)$, $(i+1,j)$, and $(i+1,j+1)$, respectively. Therefore, to perform the edge detection on the pixel $P_{11}$, the adjacent pixels are considered. The edge detection in the invention is shown as follows:

$$\text{Edge}(P_{11})=\text{Diff}(P_{10},P_{12})+\text{Diff}(P_{21},P_{02})+\text{Diff}(P_{21},P_{01})+\text{Diff}(P_{22},P_{00}).$$

The $\text{Diff}(P_X,P_Y)$ is a difference value between the two points. The difference value may be adjusted according to the preferred color or characteristic. For example, $$\text{Diff}(P_X,P_Y)=abs[(P_X(G)-P_Y(R))\times(P_Y(G)-P_X(B)\times(P_X(B)-P_Y(R))].$$

abs [Z] represents the absolute value of Z, $P_X(G)$ represents the green grey scale value of the pixel X, $P_Y(R)$ represents the red grey scale value of the pixel Y, $P_Y(G)$ represents the green grey scale value of the pixel Y, $P_X(B)$ represents the blue grey scale value of the pixel X, $P_Y(R)$ represents the red grey scale value of the pixel Y, and I, j, X, Y represent positive integers. Thus, after the edge detection is performed on the pixel $P_{11}$, the edged pixel Edge ($P_{11}$) is obtained. That is, edge detection is performed on the original grey scale data of the pixel $P_{11}$ to convert the original grey scale data to the grey scale data Edge ($P_{11}$). When the $P_{11}$ is a point on a bending part, a turning point or a part with a great deal of color change, the grey scale value is larger.

Figure 5:
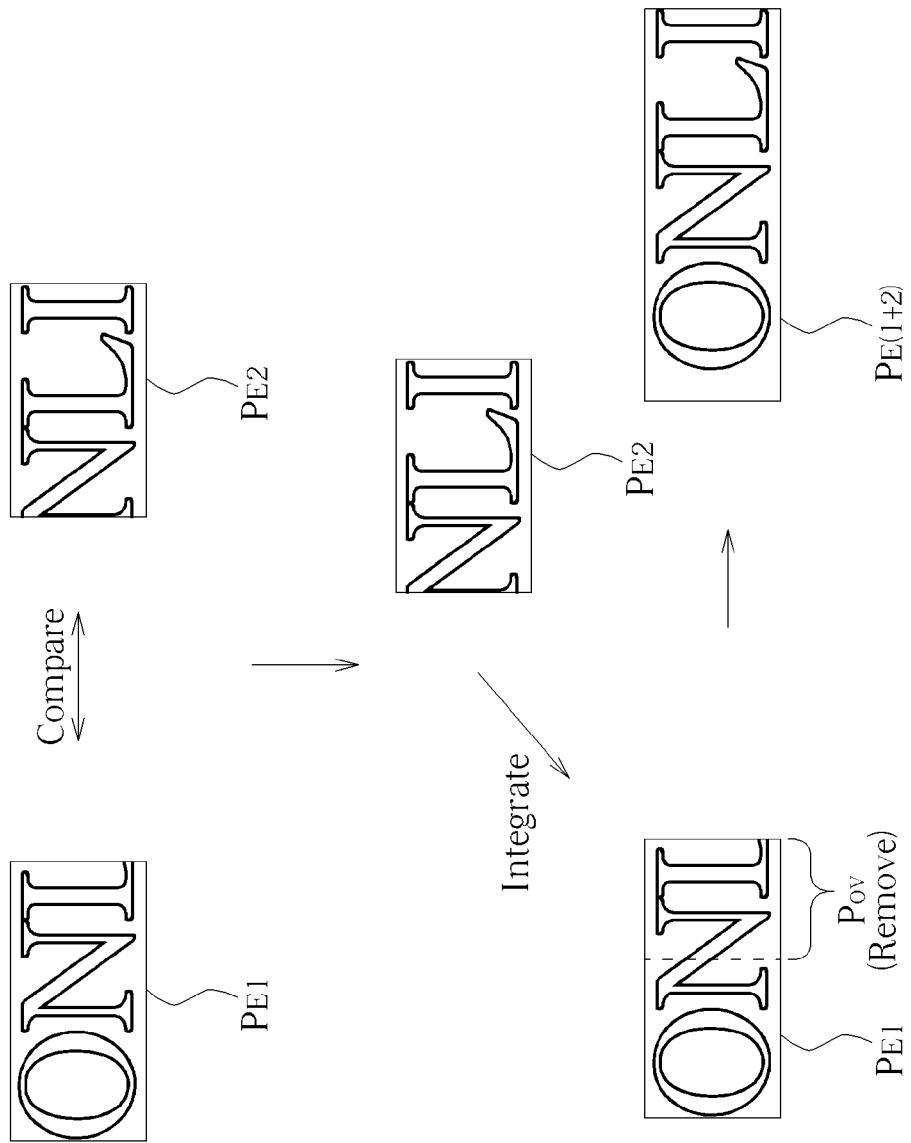
FIG. 5 is a schematic diagram showing that the edged images are integrated in the embodiment of the invention.

FIG. 5 is a schematic diagram showing that the edged images are integrated in the embodiment of the invention. As shown in FIG. 5, the edged image $P_{E1}$ and $P_{E2}$ are taken as an example. First, the edged images $P_{E1}$ and $P_{E2}$ are compared to determine the overlapping part of $P_{E1}$ and $P_{E2}$. From the illustration above, the right part of the edged image $P_{E1}$ overlaps with the left part of the edged image $P_{E2}$, and thus in FIG. 5, the edged images $P_{E1}$ and $P_{E2}$ are compared to obtain the overlapping part of the two edged images $P_{E1}$ and $P_{E2}$ correctly. Then, the overlapping part is removed from one of these two images. Here, we select to remove it from the first image $P_{E1}$. In FIG. 5, after comparison, the overlapping part of the edged images $P_{E1}$ and $P_{E2}$ is the image $P_{OV}$. Then, the overlapping image $P_{OV}$ is removed from the edged image $P_{E1}$. Afterwards, the edged image $P_{E2}$ is integrated to the edged image $P_{E1}$ in which the overlapping image $P_{OV}$ is removed to obtain an integrated image $P_{E(1+2)}$.

Figure 6:
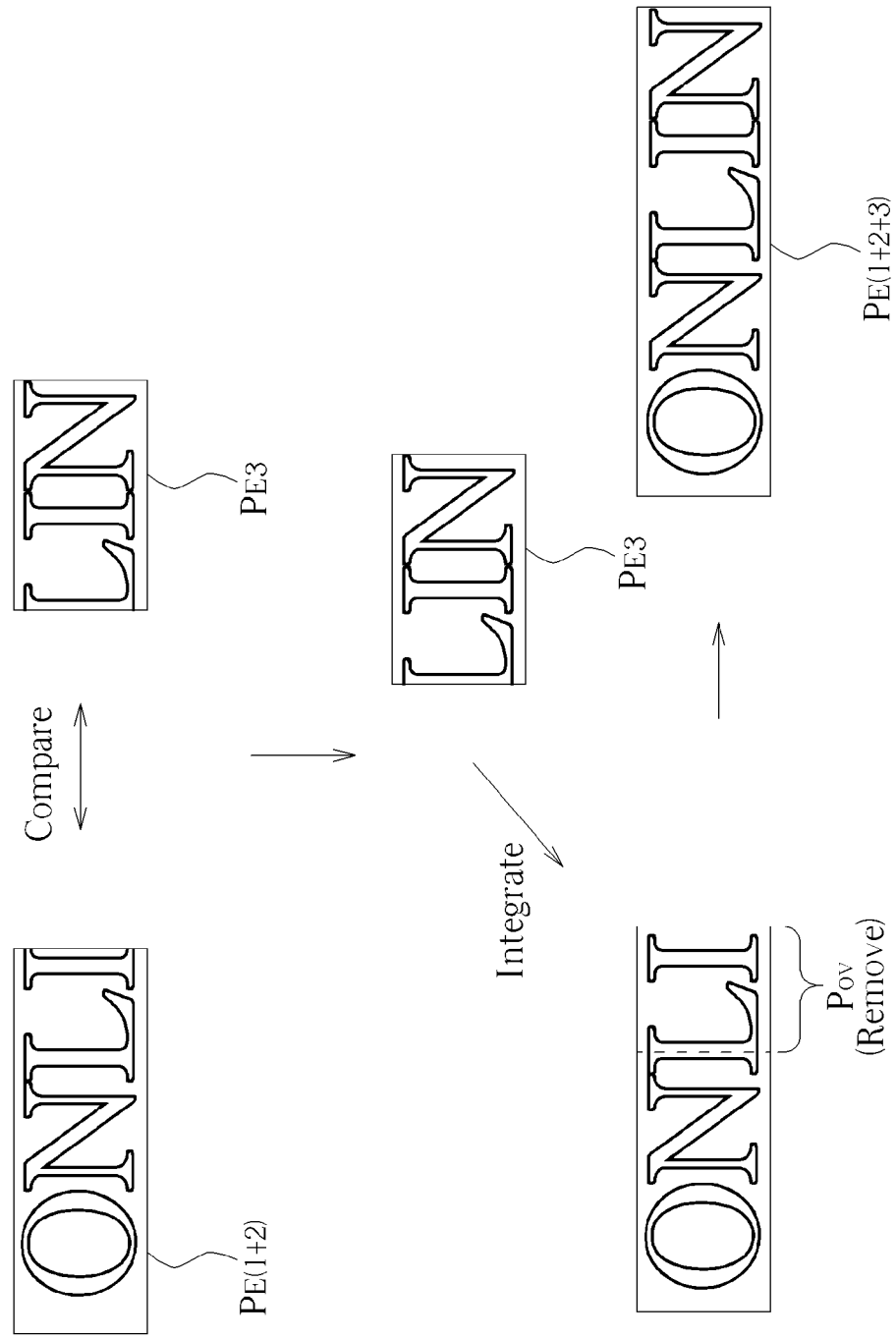
FIG. 6 is a schematic diagram showing that the integrated image is further integrated with a next edged image in the embodiment of the invention.

FIG. 6 is a schematic diagram showing that the integrated image is further integrated with next coming image. After the new coming image is received, the focused-area abstraction and edge detection will be applied on it first. That's the edge image $P_{E3}$. In FIG. 6, the integrated image $P_{E(1+2)}$ and an edged image $P_{E3}$ are taken as an example. As shown in FIG. 6, first, the integrated image $P_{E(1+2)}$ and $P_{E3}$ are compared to determine the overlapping part. As illustrated above, the right part of the integrated image overlaps with the left part of the edged image $P_{E3}$. Thus, in FIG. 6, the integrated image $P_{E(1+2)}$ and the $P_{E3}$ are compared to obtain the overlapping part. Then, the overlapping part is removed from the image $P_{E(1+2)}$ which is captured previously. As shown in FIG. 6, after comparison, the overlapping part of the integrated image $P_{E(1+2)}$ and $P_{E3}$ is determined to be the image $P_{OV}$, and then the image $P_{OV}$ is removed form the integrated image $P_{E(1+2)}$. Afterwards, the integrated image $P_{E(1+2)}$ in which the image $P_{OV}$ is removed is further integrated with the edged image $P_{E3}$ to obtain the further integrated image $P_{E(1+2+3)}$. In actual application, the camera moves along a fixed direction, and therefore the maximum overlapping area of the $P_{E2}$ and $P_{E3}$ would not overstep the $P_{E2}$. Thus, when the $P_{E(1+2)}$ is compared with the $P_{E3}$, not the whole area of the $P_{E(1+2)}$ is compared, and only the area of $P_{E2}$ is compared with the $P_{E3}$.

Figure 7:
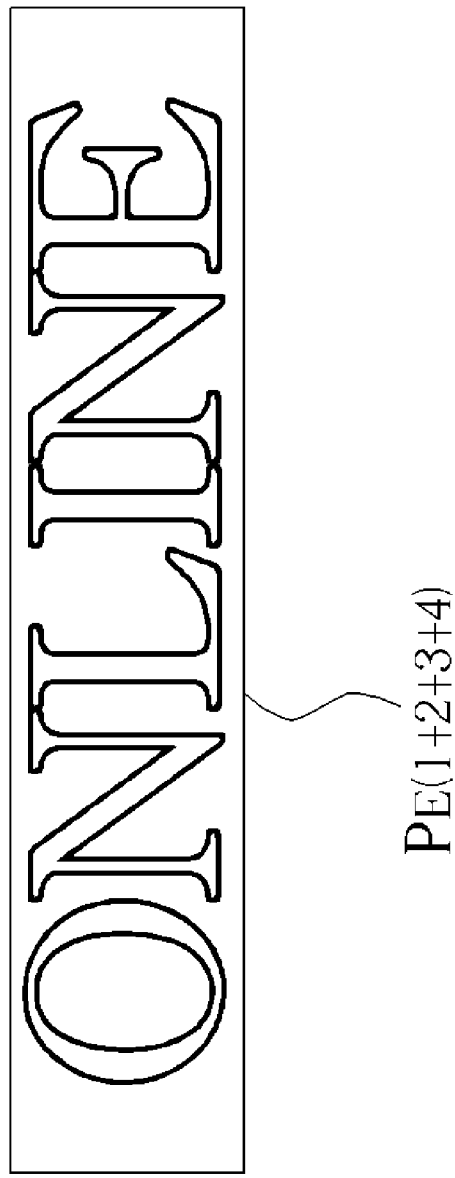
FIG. 7 is a schematic diagram showing the integrated image after the overlapping part is removed and the images are integrated.

FIG. 7 is a schematic diagram showing the integrated image after the overlapping part is removed and the images are integrated in an embodiment of the invention. As shown in FIG. 7, after the focused-area abstraction, the edge detection, matching and integrating processing, the edge images $P_{E1}$, $P_{E2}$, $P_{E3}$ and $P_{E4}$ are integrated to be an integrated image $P_{E(1+2+3+4)}$. In the integrated image $P_{E(1+2+3+4)}$, the overlapping parts in the edged images $P_{E1}$, $P_{E2}$, $P_{E3}$ and $P_{E4}$ are removed, and a single image is formed. Thus, the processed integrated image can be provided to the OCR software to recognize characters and output the correct characters, and the recognition mistake caused by the overlapping part of the images may be avoided. In addition, during the process, we can find that the $P_{E(1+\ldots+n)}=P_{E(1+\ldots+(n-1))}+P_{En}$. And for each new coming image $P_{E(n+1)}$, we just need $P_{En}$ and $P_{E(n+1)}$. SO, the procedures of integrating images and outputting the partial integrated image to allow the OCR software to process can be performed at the same time. For example, when the image $P_{E4}$ is integrating, part of $P_{E(1+2)}$ can be sent to OCR. Here, for example, the image segment "ON" may be removed from the image $P_{E(1+2+3)}$ to be provided to the OCR software to be processed, and thus the image $P_{E4}$ is actually integrated to the image segment "LIN". In choosing the removing part, the last integrated image cannot be cut. For example, when the image is removed from the image $P_{E(1+2+3)}$, the $P_{E3}$ part should be left, namely the image segment "LIN".

Figure 8:
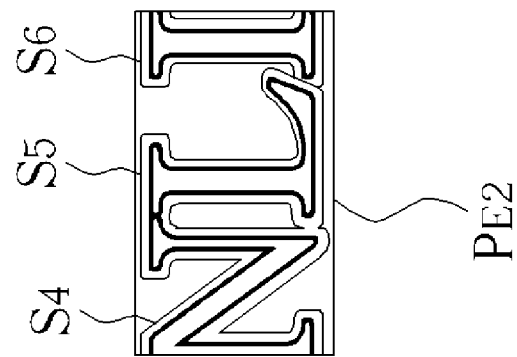
FIG. 8 is a schematic diagram showing that a shape matching comparison procedure is performed first during the edge image matching comparison procedure on the edged images.
Figure 8:
Figure 8:
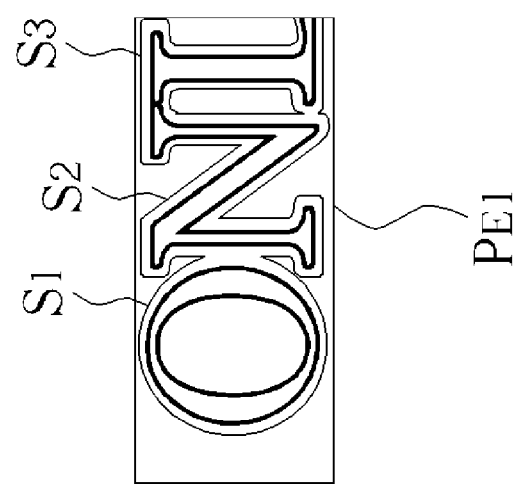

FIG. 8 is a schematic diagram showing that a shape matching comparison procedure is performed first during the edge image matching comparison procedure on the edged images. In FIG. 8, the edged images $P_{E1}$ and $P_{E2}$ are taken as an example. In FIG. 8, the edged image $P_{E1}$ includes three characters "O", "N" and the left part of "L". The corresponding shapes are $S_1$, $S_2$ and $S_3$. The edged image $P_{E2}$ includes three characters which are the right part of the character "N", "L" and the left part of "I". The corresponding shapes are $S_4$, $S_5$, and $S_6$. In the invention, according to the shapes $S_1$, $S_2$, $S_3$, $S_4$, $S_5$, and $S_6$, it is roughly determined that the shape $S_4$ matches $S_2$, and $S_5$ matches $S_3$, and then the overlapping part of the edged images $P_{E1}$ and $P_{E2}$ is roughly estimated. The shapes $S_4$ to $S_5$ of the edged image $P_{E2}$ may overlap with the edged image $P_{E1}$, and thus a rough overlapping part is obtained to have the accurate comparison in the sequence procedures.

Figure 9:
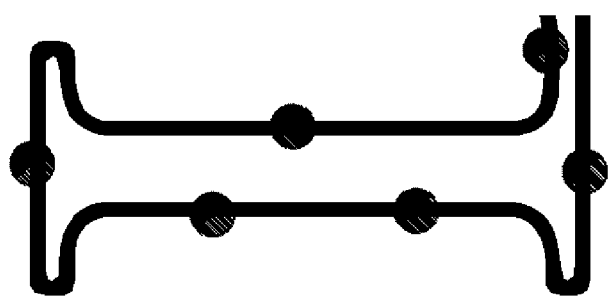
FIG. 9 is a schematic diagram showing that characteristic points of the characters are located and compared in the invention.

FIG. 9 is a schematic diagram showing that characteristic points of the characters are located and how to be used in the following matching process in an embodiment of the invention. According to the illustration above, the characteristic points of the character may be emphasized by adjusting the formula of the difference value. That is, higher or different grey scale values are given. The characteristic points may be turning points or end points. Several characteristic points are combined to be a characteristic pattern to include the related position information of these characteristic points.

In FIG. 9, a certain part of the character "L" is taken as an example. The black points represent the characteristic points of the illustrated certain part. The combination of the characteristics includes the relation of the points and is converted to a characteristic pattern. If the characteristic pattern in character A also can be found in character B, it is determined that character A and character B are the same character. Practically, we achieve the matching by indentifying the characteristic pattern on one image, and moving the characteristic pattern on another image to find the best matching area. After the shape matching comparison in FIG. 8, the rough overlapping area is obtained. A more accurate characteristic matching comparison is performed to determine the overlapping part of the two adjacent edged images. By the characteristic pattern matching, the overlapping part of the characters may be obtained accurately to obtain the overlapping image $P_{OV}$ in the adjacent edged images. Then, the overlapping image $P_{OV}$ is removed, and the edged image is further integrated to the next edged image to obtain an integrated image. In actual application, if the device needs to have the same using mode as the scanning pen, the camera may get closer to the surface of the object, namely a close-up photographing mode. In the close-up photographing mode, the adjacent images may have slight distortion. In addition, with the interaction of the lateral light and the surface of the object, although the adjacent images are obtained from the same object and they should be the same, they still have differences. Therefore, the same characters in two images are not totally the same, and too much calculation and comparison of characteristic points may affect the performance of the whole system. Thus, a characteristic pattern constructed of characteristic points with a proper quantity is used, and the position having the minimum difference is considered a dovetailing position. Thus, the shape matching procedure herein not only improves the speed, but also improves the precision of integration.

Figure 10:
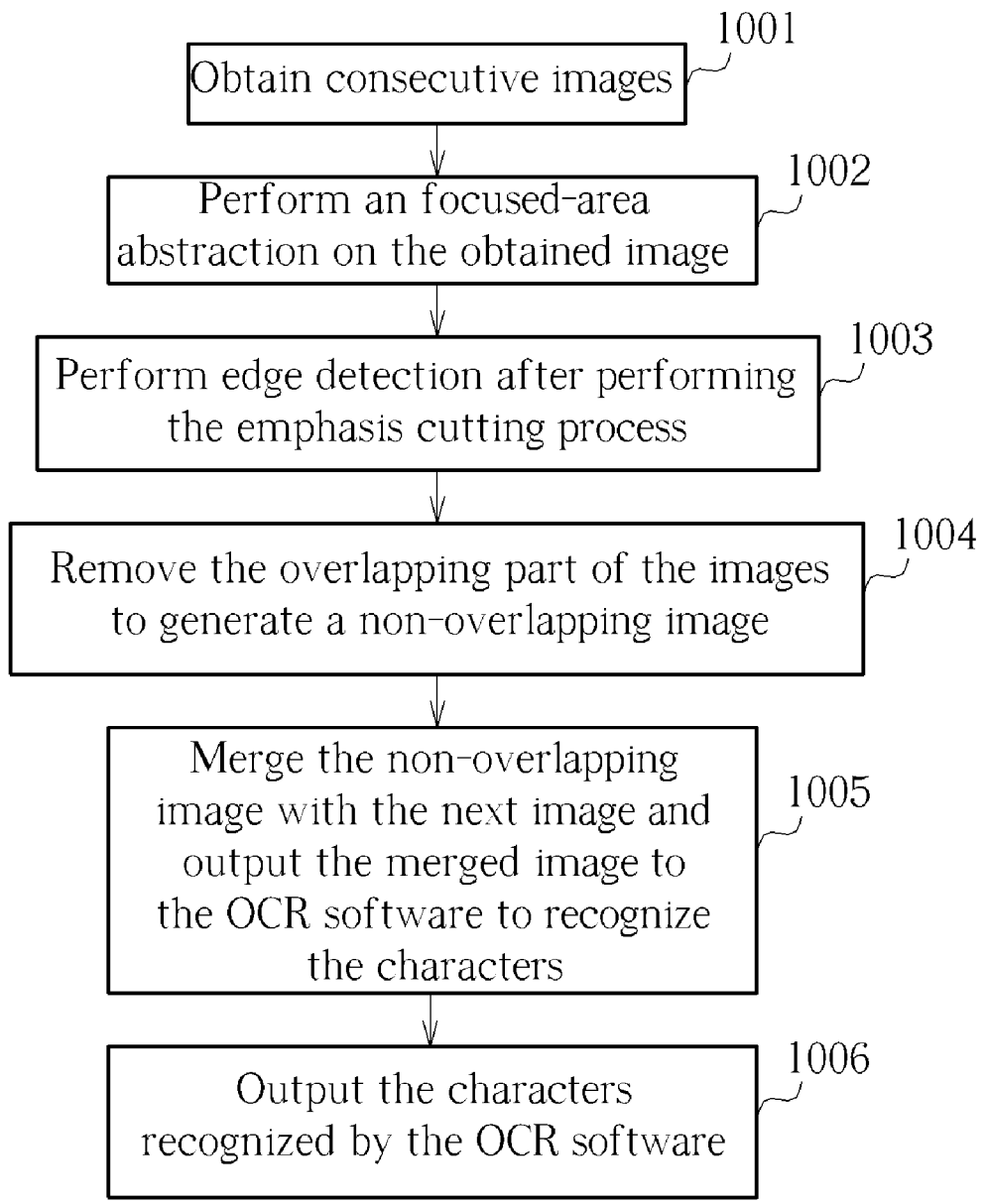
FIG. 10 is a flow chart showing a method for converting the consecutive images to consecutive characters to output in the invention.

FIG. 10 is a flow chart showing a method for converting the consecutive images to consecutive characters to output in the invention. The steps are as follows.

In step 1001, consecutive images are received.

In step 1002, an focused-area abstraction is performed on the received image.

In step 1003, an edge detection is performed on the cut image after the focused-area abstraction.

In step 1004, the cut first image and the cut second image are compared to remove the overlapping part of the first image and the second image to generate a third image.

In step 1005, the third image and the second image are integrated to be outputted to the OCR software to recognize the characters.

In step 1006, the characters recognized by OCR software are outputted.

In step 1004, the second image is the next image of the first image. Thus the second image and the first image certainly have overlapping parts. In other words, in the invention, it is supposed that two consecutive images have overlapping parts, and thus the sequence character recognition and integration flow path may be performed correctly.

In step 1004, the images are compared by shape comparison and characteristic pattern matching. However, the shape comparison is not necessary, and it is only used to increase the speed of the later characteristic comparison. That is, in step 1004, if only the characteristic comparison is performed, the precise overlapping images also may be obtained and removed from the first image.

In addition, the camera in the invention may be disposed in a portable electronic device (such as a mobile phone, a notebook computer and so on). Thus, the user may use the invention to scan the objects.

To sum up, by using the method of the invention, the user may uses the camera to record, and after the processing in the invention, consecutive characters are outputted to achieve the function of recoding while outputting characters, which provides more convenience.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

Those skilled in the art will readily observe that numerous modifications and alterations of the device and method may be made while retaining the teachings of the invention.

What is claimed is:

1. A method for outputting consecutive characters in a video-recording mode, comprising:
   recording the object by a camera along a direction to obtain a first image and a second image, wherein the second image is the next image of the first image;
   performing an edge detection on the first image and the second image, further comprises;
   converting the grey scale data of the pixels of the image and the second image as follows:

$$\text{Edge}(P_{(i,j)}) = \text{Diff}(P_{(i,j-1)}, P_{(i,j+1)}) + \text{Diff}(P_{(i+1,j-1)}, P_{(i-j+1)}) + \text{Diff}(P_{(i+1,j)}, P_{(i,j-1)}) + \text{Diff}(P_{(i+1,j+1)}, P_{(i-1,j-1)});$$

wherein i, j, X, Y represent positive integers, and Edge ($P_{(i,j)}$) represents the grey scale data after the edge detection;

wherein $\text{Diff}(P_X, P_Y) = \text{abs}[(P_X(G) - P_Y(R)) \times (P_Y(G) - P_X(B)) \times (P_X(B) - P_Y(R))]$, and the abs is an absolute value function, $P_X(G)$ is the green grey scale value of the pixel X, $P_Y(R)$ is the red grey scale value of the pixel Y, and $P_Y(G)$ is the green grey scale value of the pixel Y, $P_X(B)$ is the blue grey scale value of the pixel X, $P_Y(R)$ is the red grey scale value of the pixel Y.

comparing the first image with the second image to obtain a third image which is an overlapping part of the first image and the second image;

removing the third image from the second image to generate a fourth image;

merging the fourth image with the first image to generate a fifth image; and performing an optical character recognition (OCR) on the fifth image, to output the characters in the fifth image.

2. The method according to claim 1, wherein the step of comparing the first image with the second image to obtain the third image which is the overlapping part of the first image and the second image comprises:

comparing the first image and the second image from the part of the first image at the direction and the part of the second image at a direction opposite to the direction until the third image which is the overlapping part of the first image and the second image is obtained.

3. The method according to claim 1, wherein the step of merging the fourth with the first image to generate a fifth image is comprises:

merging the part of the fourth image at a direction opposite to the direction with the part of the first image at the direction.

4. The method according to claim 2, wherein the step of comparing the first image with the second image to obtain the third image which is the overlapping part of the first image and the second image further comprises:

detecting characteristics of the characters in the first image and the second image to obtain the third image which is the overlapping part of the first image and the second image.

5. The method according to claim 4, wherein the step of detecting the characteristics of the characters in the first image and the second image to obtain the third image which is the overlapping part of the first image and the second image comprises:

searching characteristic pattern of the characters in the second image to compare and search in the first image to obtain the third image which is the overlapping part of the first image and the second image.

6. The method according to claim 4, further comprising:

detecting shapes of the characters of the first image and the second image to obtain the third image which is the overlapping part of the first image and the second image.

7. The method according to claim 1, further comprising:

performing an focused-area abstraction on the first image and the second image to reduce the sizes of the first image and the second image.

8. The method according to claim 7, wherein the step of performing the focused-area abstraction on the first image and the second image comprises:

detecting non-character parts of the first image and the second image; and cutting the non-character parts of the first image and the second image.

* * * * *